(12) United States Patent
Brondo, Jr.

(10) Patent No.: US 7,486,769 B2
(45) Date of Patent: Feb. 3, 2009

(54) ADVANCED MULTI-RESONANT, MULTI-MODE GAMMA BEAM DETECTION AND IMAGING SYSTEM FOR EXPLOSIVES, SPECIAL NUCLEAR MATERIAL (SNM), HIGH-Z MATERIALS, AND OTHER CONTRABAND

(76) Inventor: Joseph H. Brondo, Jr., P.O. Box 1027, Wainscott, NY (US) 11975

( * ) Notice: Subject to any disclaimer, the term of this patent is extended or adjusted under 35 U.S.C. 154(b) by 0 days.

(21) Appl. No.: 11/628,566

(22) PCT Filed: Aug. 6, 2004

(86) PCT No.: PCT/US2004/025446

§ 371 (c)(1),
(2), (4) Date: Feb. 21, 2007

(87) PCT Pub. No.: WO2005/121756

PCT Pub. Date: Dec. 22, 2005

(65) Prior Publication Data

US 2007/0263767 A1    Nov. 15, 2007

Related U.S. Application Data

(60) Provisional application No. 60/576,496, filed on Jun. 3, 2004.

(51) Int. Cl.
*G01N 23/04* (2006.01)

(52) U.S. Cl. .......................................... 378/57; 378/63

(58) Field of Classification Search ................. 378/98.8, 378/57, 119, 120, 124, 136–138, 143, 160, 378/114, 190, 198, 202, 210; 376/114, 190, 376/198, 202, 210
See application file for complete search history.

(56) References Cited

U.S. PATENT DOCUMENTS

| | | | | |
|---|---|---|---|---|
| 4,731,572 A | * | 3/1988 | Bolie | 318/721 |
| 4,941,162 A | | 7/1990 | Vartsky et al. | |
| 5,040,200 A | | 8/1991 | Ettinger et al. | |
| 5,251,240 A | * | 10/1993 | Grodzins | 376/157 |
| 5,293,414 A | | 3/1994 | Ettinger et al. | |
| 5,323,004 A | | 6/1994 | Ettinger et al. | |
| 5,784,430 A | * | 7/1998 | Sredniawski | 378/57 |
| 6,130,926 A | * | 10/2000 | Amini | 376/194 |
| 6,215,851 B1 | | 4/2001 | Meilunas et al. | |
| 6,724,852 B1 | * | 4/2004 | Smith et al. | 376/154 |
| 2007/0172030 A1 | | 7/2007 | Melnychuk et al. | |

* cited by examiner

Primary Examiner—Irakli Kiknadze
(74) Attorney, Agent, or Firm—Scully, Scott, Murphy & Presser, P.C.

(57) ABSTRACT

A method and apparatus combining Gamma Resonance Absorption, Gamma Resonance Fluorescence, Gamma Induced Photofission, Dual Beam Gamma Energy Absorptiometry modality in a single system for contraband detection/identification. Such contraband detection systems utilize novel proton beam target devices capable of generating single or multiple monoenergetic gamma ray beams used in detection/measurement of contraband, for simultaneous detection of multiple target objects in a single scan.

27 Claims, 8 Drawing Sheets

NUCLEAR MATERIAL PRESENT

NO NUCLEAR MATERIAL PRESENT

ADVANCED MULTI-RESONANT, MULTI-MODE GAMMA BEAM DETECTION AND IMAGING SYSTEM FOR EXPLOSIVES, SPECIAL NUCLEAR MATERIAL (SNM), HIGH-Z MATERIALS, AND OTHER CONTRABAND

CROSS-REFERENCE TO RELATED APPLICATIONS

This application claims priority under 35 U.S.C. §119(e) of U. S. provisional patent application, Ser. No. 60/576,496, entitled "Advanced Multi-Resonant, Multi-Mode Gamma Beam Detection and Imaging System for Explosives, SNM, High-Z Materials, and other Contraband", filed Jun. 3, 2004, the complete disclosure of which is hereby incorporated by reference for all purposes.

BACKGROUND OF THE INVENTION

1. Field of the Invention

The present invention relates to systems and methods for contraband detection/identification that employ modalities incorporating Gamma Resonance Absorption, Gamma Resonance Fluorescence, Gamma Induced Photofission, and Dual Beam Gamma Energy Absorptiometry techniques and combinations thereof in a single system.

2. Description of the Prior Art

Systems for detecting nitrogen based elements in contraband materials are fairly well known. These systems basically utilize the irradiation of such materials with gamma rays and the detection of gamma rays emitted or absorbed by the materials after subjecting them to the input gamma rays of specific energy to be preferentially absorbed or to induce fluorescence in the specific elemental material being detected. One technique of such detection is Gamma Resonance Absorption (GRA) analysis. This type of system generally utilizes the effect of gamma ray absorption by the nucleus of the objects being interrogated during irradiation. The concentration of these gamma rays are detected by gamma ray detectors or arrays of detectors and the signals analyzed to determine the concentrations of chemical elements which make up the object being interrogated. These elements are found in explosives or illicit drugs in differing quantities, ratios and concentrations. By calculating and determining the ratios and concentrations, it is possible to identify and differentiate targeted contraband substances.

Figure 1A:
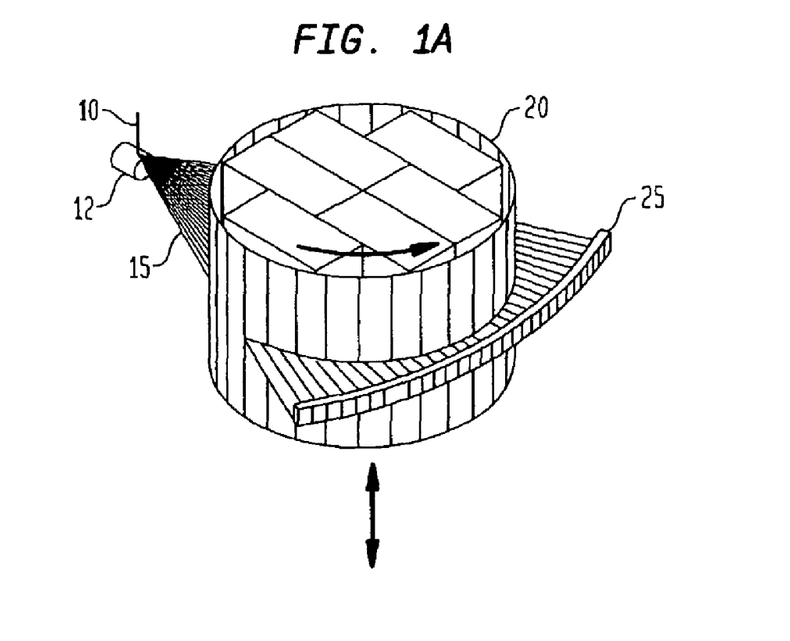
FIG. 1(a) illustrates a contraband detection system (CDS) according to one aspect of the invention.
Figure 1B:
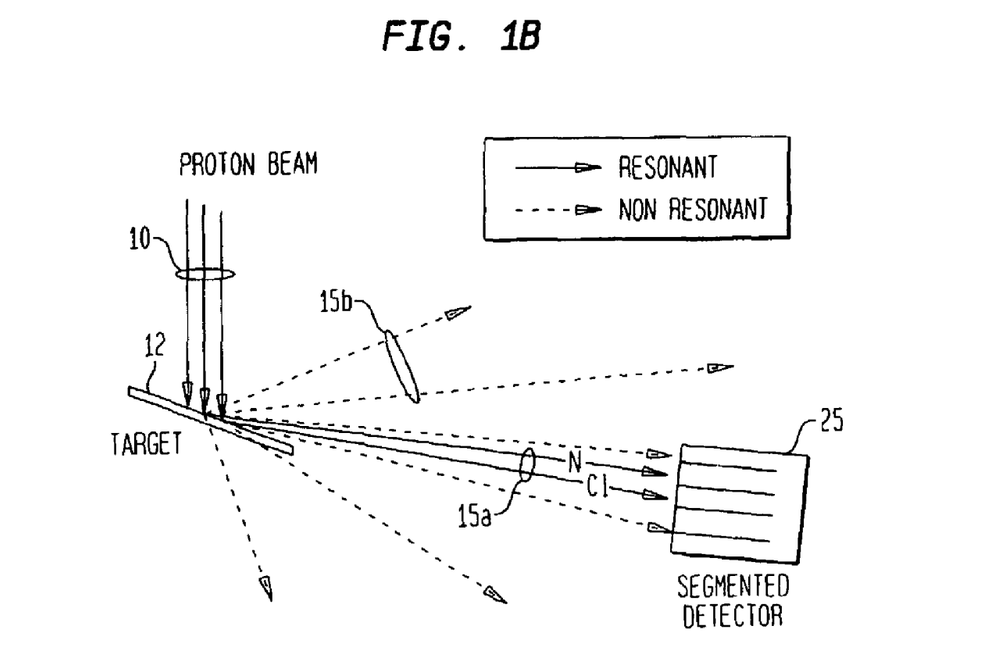
FIG. 1(b) depicts the exemplary gamma beam geometry in the CDS depicted in FIG. 1(a)

In such Contraband Detection Systems (CD or CDS), an example of which is shown in FIG. 1(a), a proton beam 10 is generated that is directed to a proton beam target device 12 that generates a gamma ray fan 15 that is directed to a target object 20 such as a rotating baggage container. Such a GRA CDS system is described in U.S. Pat. No. 5,784,430 the whole contents and disclosure of which is incorporated by reference as if fully set forth herein. Such CD systems are distinguishable by the manner in which the proton beam is generated: 1) Electrostatic Accelerator based, and 2) RF Accelerator based. An early form of the Electrostatic Accelerator based CDS comprises a high current (e.g., 10 mA) electrostatic accelerator, a specially designed proton beam target 12 for gamma generation, and a detector such as segmented and arrayed Bismuth Germinate (BGO) detectors 25. The accelerator produces a beam of protons 10, e.g., at energies of about 1.75 MeV, with a very narrow energy spread. As shown in FIG. 1(b), this high energy proton beam is bombarded onto the specially designed target 12 which is coated with a thin film of $^{13}C$ (of about 1 micron thick) to generate resonant gamma rays 15a at an energy of about 9.17 MeV by the reaction $^{13}C(p,\gamma)^{14}N$ and, additionally, generates non-resonant gamma emissions 15b. The resultant gamma rays 15a are preferentially absorbed by $^{14}N$ in explosives-type contraband. The penetrating power of the gamma rays combined with a tomographic detection scheme allows 3-D images of the total density and select element density in the interrogated cargo/luggage/container to be generated which is then utilized to detect for the presence of concealed explosives utilizing the ratio of resonant to non-resonant absorption thereby providing the ratio of Nitrogen density to total density.

With the on-going threat of terrorism all over the world, the need has come for improved means of detecting contraband materials, including nitrogen and nuclear containing explosives that may be concealed in vehicles such as cars, trucks automobiles, shipping containers, airplanes, etc. This requires the implementation of improved proton beam target devices. The need has also come for a versatile, multi-mode, single CDS that employs a variety of non-invasive active and passive detection techniques that can be used for detecting a variety of target materials, including nuclear materials.

It would thus be highly desirable to provide a Contraband Detection System and methodology incorporating numerous means in combination as a single stand alone system or, operated as separate systems with single or multiple capabilities utilizing single or multiple non-intrusive active gamma beam probes to detect, analyze and/or image the contents of objects, e.g., shipping containers, cargo, parcels, luggage, trucks, vehicles, railroad cars, mail, checkpoints, border crossings etc.

It would be further highly desirable to provide a CDS and methodology providing a non-intrusive, single scan means for detecting explosives, nuclear bombs and nuclear materials, shielding of nuclear or other materials, drugs, chemical warfare agents and other contraband of interest. The detection can be utilized in various configurations including inline, portal, remote and standoff.

It would be additionally desirable to provide a CDS and methodology for providing a non-intrusive, single pass/multiple scan means for detecting explosives, nuclear bombs and nuclear materials, shielding of nuclear or other materials, drugs, chemical warfare agents and other contraband of interest. The detection can be utilized in various configurations including inline, portal, remote and standoff.

It would be highly desirable to provide a novel proton beam target design of increased durability that is capable of better withstanding impact of high energy proton beams utilized in the generation of gamma rays for such CDS systems.

SUMMARY OF THE INVENTION

The present invention is directed to a method and apparatus incorporating numerous means in combination as a single stand alone system and/or operated as separate systems and/or operated as an integrated system comprised of multiple systems with single or multiple capabilities utilizing single or multiple non-intrusive active gamma beam probes to detect, analyze and/or image the contents of objects i.e. shipping containers, cargo, luggage, trucks, vehicles, railroad cars, mail, checkpoints, border crossings etc. The apparatus provides a single pass/multiple scan means of detecting explosives, nuclear bombs and nuclear materials, shielding of nuclear or other materials, drugs, chemical warfare agents and other contraband of interest. The detection can be utilized in various configurations including inline, portal, remote and standoff.

Thus, according to the second aspect of the invention there is provided a multi-modal contraband detection system for detecting contraband materials in one or more target objects, the system comprising: a proton beam accelerator device for producing a high energy beam of protons at a specific energy; a single proton beam target for generating one or more gamma ray beams in response to impinging high energy beam of protons, the generated one or more gamma ray beams being simultaneously directed to a target object; and, a plurality of detector means associated with the target object, wherein the plurality of detector means provide multiple modes of detecting presence of contraband materials in each said target object. One of the plurality of detector means includes a nuclear resonance fluorescence detector array to detect fluorescing reaction preferentially on an incoming proton beam side of a target object or at various locations with a reference of $4\pi$ to the object, a gamma-insensitive neutron detector array to detect neutrons emitted in a photofission reaction with material included in a target object, a high-Z sandwich detector array, a non-resonant detector array, a resonant detector array enriched with a sample of an element that is being detected. These may be provided singly or in combination to enable a variety of contraband detection modalities. Further contemplated is the addition of detector means including means selected from the group comprising: X-ray/CT-X-ray detection, Dual energy X-ray detection, multiple energy/multiple beam CT-X-ray X-ray Backscatter, X-Ray Diffraction and Terahertz interrogation devices. Further contemplated is the addition of passive detector means including a vapor detection device, and/or a radiation detection device, and or Terahertz Camera, Quadrapole Resonance devices.

Enabling multi-modal detection of the contraband detection system is the provision of gamma beam generating proton beam targets in a variety of configurations that include, but are not limited to: a composite configuration comprising two or more different materials for generating multiple gamma ray beams each associated with a reaction of protons with a respective material; a layered configuration comprising two or more different materials for generating multiple gamma ray beams each associated with a reaction of protons with a respective material; and, a segmented configuration comprising at least two different materials for generating multiple gamma ray beams each associated with a reaction of protons with a respective material. An additional means of producing the multiple beams includes the use of more than one proton accelerator and target configuration each producing its own selective gamma beam. Another means of producing multiple beams includes a means of splitting or switching the primary proton beam into different beam transports each specifically designed to adjust the beam energy and parameters prior to impinging on individual targets.

BRIEF DESCRIPTION OF THE DRAWINGS

Further features, aspects and advantages of the apparatus and methods of the present invention will become better understood with regard to the following description, appended claims, and the accompanying drawings where:

DETAILED DESCRIPTION OF THE PREFERRED EMBODIMENT

The present invention is further directed to CD systems that incorporate the production of mono-energetic gamma beams produced by (a) beam production system(s) which include(s) a means for producing accelerated protons or heavier ions to specific energies to impinge upon and interact with (a) target(s) devices that produce (a) specifically tuned mono-energetic gamma ray beam(s) for active probe non-invasive interrogation. Preferably, the described CD systems may incorporate one or more accelerator units to provide the required proton beams to impinge upon one or more targets each producing one or more mono-energetic gamma beams for active interrogation. The gamma beams are chosen in the one case to provide specific resonant interaction with the nucleus of specific elements of interest common to the contraband of interest and, in the other case, to produce additional non-resonant gamma beams for imaging and interrogation. The system is unique in that Nuclear Resonance Fluorescence and/or Nuclear Resonance Absorption and/or non-resonant absorption and/or Photo-fission phenomena are utilized simultaneously by the same active beams(s). The non-resonant absorption/attenuation of the beam(s) is used for imaging the total density similar to normal x-ray, dual energy x-ray and cat-scan (3-D tomography). Tomography may be accomplished by rotation of the object, rotation of the beams, or multiple beams at various angles. Similarly the combination of elemental resonant absorption and/or attenuation of the beam(s) may be measured simultaneously by the same means utilizing different detector arrays.

It should be understood that a combination of two or more resonant and/or non-resonant beams may be generated that are separated by several MeV and the measured absorption/attenuation of each in comparison with the other allows for an algorithm to provide a sensitive measure of the "Z" (atomic number) of the materials within the scanned object rapidly. This is similar to methods used in DEXA Dual Energy X-Ray Analysis for X-ray measure of body composition e.g., calcium densities. This provides for detection of high-Z materials in nuclear threats and shielding used in concealing these threats. According to the invention, gamma absorption and/or fluorescence measurements are detected by single and/or arrays of commercially available gamma detectors and/or energy discriminating detectors and/or position sensitive detectors and/or resonant detectors, and/or composite sandwich resonant detectors (detecting multiple resonant signals from multiple elements and, simultaneously, non-resonant signals in the same detector), etc. Ratios of elemental to total density and element to element density and/or threat algorithms using these in combination with image recognition and cross correlation with additional information provided by the interrogating beams and detector combinations will provide for automatic detection of specific threat objects, and provide indication of type and quantity. The image produced will provide further information for evaluation of the threat shape, size and location. The resonant fluorescence measurements are used simultaneously to provide detection and imaging of specific elements of interest. It does not require resonant detectors however, these may be used for separation of resonant and non-resonant gamma rays. Imaging can be accomplished by several means including PET or like scanners or reverse reconstructive imaging. This may be also used independently as standoff detection or single sided detection as would be required in some instances such as landmines, buried UXO (unexploded ordinance) or other applications where the scanned object does not allow for detectors on the far side such as standoff detection for trucks and vehicles. The use of mono-energetic gamma beams provides for an additional identification of nuclear materials and threats with the selection of at least one of the beams at energy above the threshold for inducing Photo-fission (approximately 6 MeV) within the nuclear material. In this case specific neutrons will be emitted indicating the presence of specific nuclear materials even in the case of shielded materials. The measure of these neutrons requires (a) specific neutron detector(s). Gamma insensitive detectors such as (a) $^3$He—Xe neutron detector(s) may be employed for this purpose.

The proton beam targets used for gamma beam production are chosen by required proton or heavier ion beam energy and target element, for instance, as described in U.S. Pat. Nos. 5,040,200, 5,323,004 and 5,293,414 the whole contents and disclosure of each are incorporated by reference as if fully set forth herein. Each of the patents includes also an overall description of the process and specifies requirements for detectors and the types of resonant detectors. Specifications for a high current proton beam target are provided in U.S. Pat. No. 6,215,851 incorporated by reference herein, and include a $^{13}$C diamond layer proton beam target designs utilized in the electrostatic accelerator and RF accelerator based CDS systems as described in co-pending U.S. Provisional Application No. 60/492,749 the whole contents and disclosure of each are incorporated by reference as if fully set forth herein.

Additional proton beam targets may be constructed as composite, segmented and/or layered materials such as a Boron Carbide ($B_4C$) target enriched with $^{13}$C to producing multiple beams of 4.4 MeV, and 12 MeV gamma ray beams from Boron and 9.17 MeV from the $^{13}$C through $(p,\gamma)$ resonance reactions. Other composite targets may be designed in similar fashion to produce multiple beams, e.g., $^{26}$Mg and $^{30}$Si at about 1.94 MeV and about 1.91 MeV, respectively, to detect $^{14}$N with γ 9.173 MeV, $^{16}$O with γ 9.082 MeV and $^{35}$Cl with γ 7.117 MeV. Other targets such as $^{19}$F may be used for the $^{19}$F $(p,\alpha\gamma)$ $^{16}$O reaction for $^{16}$O and to induce neutron emission from fissile and fissionable materials as well as certain non-fissional controlled materials. The proton beam target designs may also be segmented and rotating.

Configurations of CDS systems according to the invention are flexible and cost effective in that the proton beam targets may be further constructed either of single elements, composite elements, layered elements or segmented elements to provide one or more multiple mono-energetic beams each independent in energy for simultaneous scanning for one or multiple elements and providing the capability for inducing Photo-fission and sensitive efficient measure of high-Z elements. The gamma ray beam geometry allows for scanning of multiple objects at the same time from each target and detector set. The system geometry allows for each single accelerator to support multiple detection stations simultaneously and/or beam splitting and/or beam switching and/or timesharing each with the capacity to scan multiple objects at the same time. Both the beam geometry and system geometry provides the capability to scan inline (conveyor or other) a flow of objects while moving alarmed objects (possible threats) to another portion of the same beam for continuous in depth examination. This allows for high throughput with resolution of alarms simultaneously. The entire system may be operated remotely by an operator at a separate location than the system, or objects may be scanned at a distance (e.g., standoff detection as shown in FIG. 15) where the entire system is remote from the object being interrogated.

It is understood that other targets may be constructed including composite and/or layered materials capable of producing specifically tuned gamma beams signal or multiple gamma ray beams at different energies, for detection/identification of evolving threat materials. Furthermore, other targets may be implemented to enhance gamma beam(s) quality and system performance (e.g., provide a target with increased ability to withstand high heat of accelerating protons).

The key advantage of the system is its concurrent use of three inspection modalities that significantly augment the detectability of nuclear threat materials. These modalities include: 1) Photofission—In fissile materials, gamma rays with energies above about 5.6 MeV undergo a photofission reaction inducing emission of prompt- and delayed-neutrons that are detected using neutron detectors. Detection of delayed neutrons is an unequivocal signature of the presence of nuclear materials with some possibility for identifying them; 2) High Z—Dual- or triple-energy beam absorptiometry separates materials with different electron densities. In addition to Compton scattering, gamma rays at energies above about 5 MeV interact by pair production providing increased sensitivity to high-Z materials. Thus, by monitoring the intensity ratios of the gamma-ray beams, high and low Z materials can be discriminated, in contrast to other ways in which they may represent the same optical thickness to a single energy beam. It is understood that a $^{13}$C target, with the addition of one or more isotopes, will support differentiation of high-Z materials; and, 3) Resonance—When finely tuned to the first nuclear level of an element of interest, gamma rays will undergo element-specific resonance attenuation and fluorescence, in addition to the photoelectric-, Compton-, and pair-production processes. For example, gamma rays at about 9.17 MeV will interact specifically with nitrogen encountered in all high explosives. Additional specifically tuned gamma beams will identify elements required to identify evolving threat materials.

Figure 2:
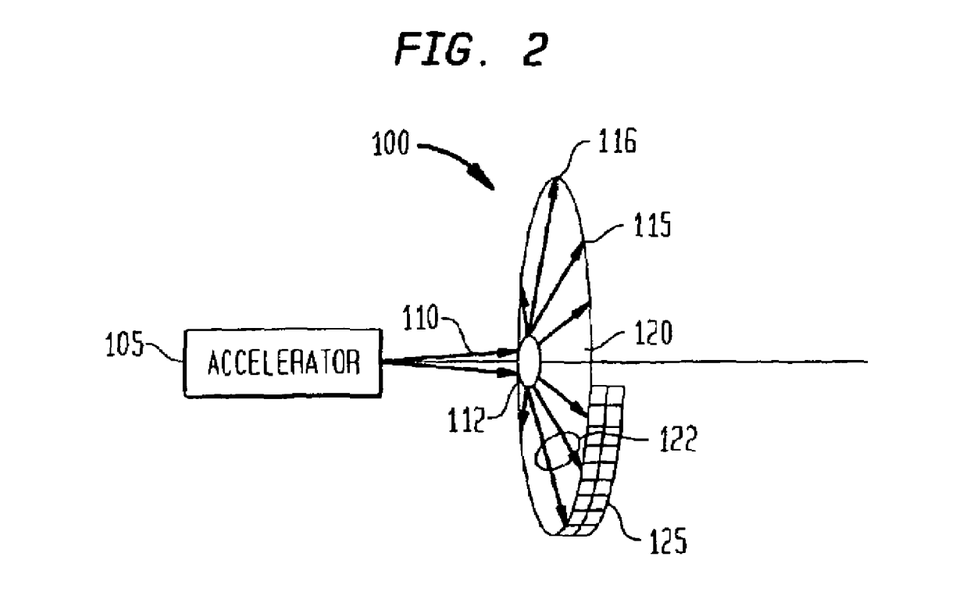
FIG. 2 is a conceptual 3-dimensional view encapsulating an exemplary CDS process including gamma-beam production, collimation, and detection wherein the gamma-rays produced appear as an open umbrella with the proton beam acting as an axis.

The CDS systems described herein employing use of the new proton beam targets may be used in a variety of modalities. However, one such CDS mode described herein with respect to FIG. 2, encapsulates the entire process 100 for gamma-beam production, collimation, and detection and employs the use of the enriched boron-carbide ($B_4C$) proton beam target. As shown in FIG. 2, an intense proton beam 110, e.g., at an energy of about 1.75 MeV generated from an accelerator 105 such as described herein, impinges upon the boron-carbide ($B_4C$) target 112 enriched with $^{13}C$ to produce two gamma-ray beams 115 from Boron, at respect energies of 4.4 MeV, and 12 MeV, and a single gamma-ray beam 116 of an energy of about 9.17 MeV from the $^{13}C$ through $(\rho,\gamma)$ resonance reactions. From a small spot on the target these gamma rays are emitted in all directions with small variations in their intensities, due to the angular correlation, and in their energy due to Doppler shift resulting from proton absorption by the nuclei. Using shielding materials surrounding the target, the gamma rays are collimated to a conical envelope with an opening angle of about 80.7° relative to the proton beam's axis and an angular width of 0.7°. Thus, a gamma ray beam fan 120 is created that appears as an open umbrella with the proton beam 110 acting as an axis as shown in the conceptual 3-dimensional view of the system shown in FIG. 2.

It is understood that this technique described herein with respect to FIG. 2 may be extended to provide gammas at other specific energies that are resonant with other elements such as carbon, oxygen, and chlorine. By combining the specific absorption of the various gammas, the ratios of the elemental composition of the intervening material can be deduced, giving a very specific detection of the material. Measurement of the total and nitrogen densities enable the detection of explosives and combining a measurement of carbon or oxygen will improve the technique even further. Also, measurement of chlorine will make it possible to detect other explosives. To make these multiple-energy gamma beams requires a target that has one or more additional isotopes applied along with the $^{13}C$ during target fabrication.

The specific angles are required to satisfy resonance conditions of the 9.17 MeV gamma-ray beam interacting with nitrogen. No such requirements exist for photofission or beam absorptiometry. As shown in FIG. 2, once the gamma beam fan 120 intercepts a targeted object 122, for example, a parcel or a cargo container, and interacts with its content, it is subsequently monitored by an array of detectors 125 encompassing the object. These include a linear array of resonance detectors, especially developed and tested for nitrogen detection that would, by scanning, display a 2-D distribution, or, by utilizing a rotating mechanism, a 3-D distribution of nitrogen (explosives) in the object. The same array may consist of BGO or Sodium Iodide, High-Z sandwich, or other detectors. At the same time, the system also displays a map of the total density of the object. Additional conventional detector arrays (not shown) may assist in detecting and imaging non-resonant radiation, and detector arrays on the near side of the object can detect gamma resonance fluorescence, while a separate battery of neutron detectors may be provided that are responsible for detecting neutrons induced by photofission.

Figure 3:
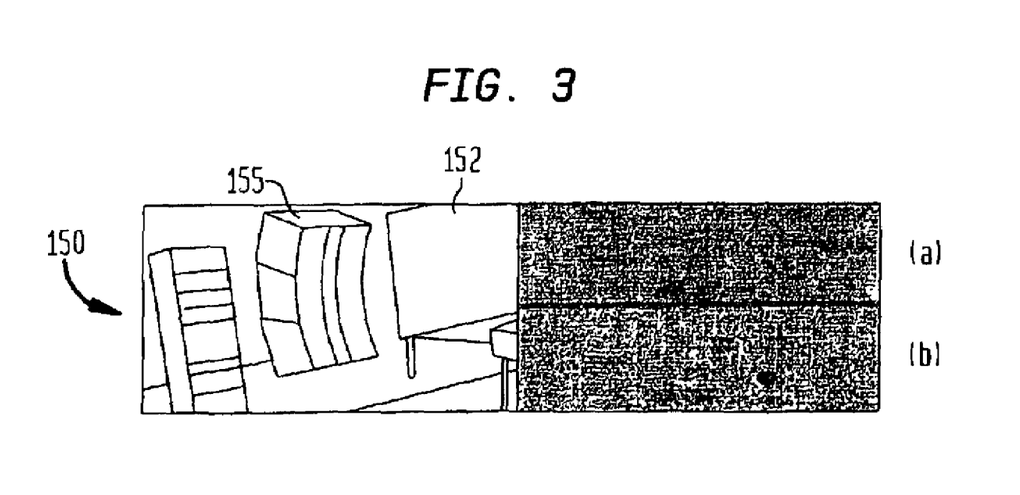
FIG. 3 depicts the system of FIG. 2 utilized for scanning an example air cargo container using gamma-resonance detectors of a modality adapted to map of the total density and the nitrogen density of the container contents thus indicating resonance detection of nitrogen.
Figure 4A:
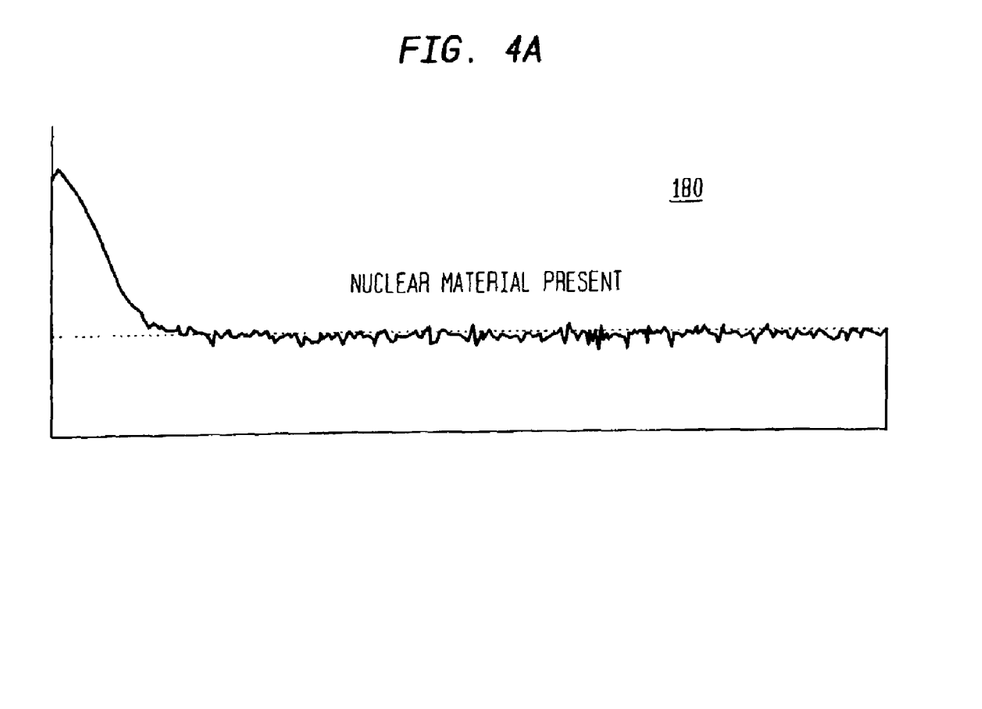
FIGS. 4(a) and 4(b) illustrate example results obtained when the system of FIG. 3 is utilized in a modality for detecting delayed neutron detection due to photofission with FIG. 4(a) illustrating delayed neutrons from a cargo container with nuclear material inside and delayed neutrons from a cargo container without nuclear material inside (FIG. 4(b))
Figure 4B:
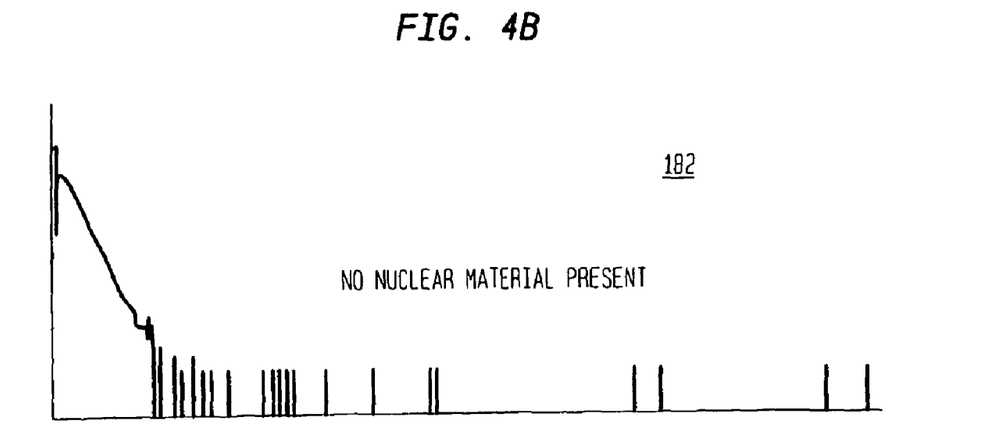

Two of the proposed modalities are demonstrated for an exemplary CDS 150 shown in FIG. 3, which depicts the system of FIG. 2 utilized for scanning an example LD-3 (International Air Transport Association specified) air cargo container 152 using gamma-resonance detectors 155. As shown in FIGS. 3(a) and 3(b), the two demonstrated modalities results in two images: for example, a first image 160 representing the map of the total density of the container contents and, a second image 170 representing the map of the nitrogen density of the container contents indicating resonance detection of nitrogen. The basic results for a delayed neutron detection due to a photofission reaction are additionally shown in FIGS. 4(a) and 4(b), respectively, that depict a neutron measurement following a pulse of high-energy gammas as a function of time. FIG. 4(a) particularly depicts an example delayed neutron measurement plot 180 illustrating a large number of delayed neutrons emitted from a cargo container after only 2 ms indicating presence of nuclear material inside and, a delayed neutron measurement plot 182 indicating delayed neutrons emitted from a cargo container without nuclear material inside (FIG. 4(b)).

Figure 5:
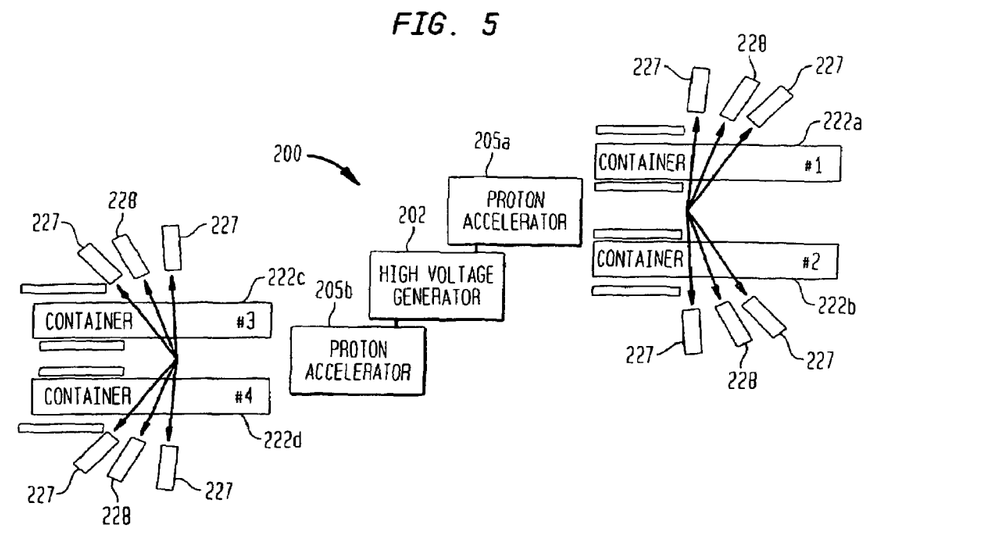
FIG. 5 depicts a CDS system utilizing two proton accelerators adapted for inspecting multiple target objects in a single line system.

FIG. 5 depicts a multimode CDS system 200 including an expansion of the basic CDS unit (of FIG. 2) by adding various detection systems and accelerators to a single high voltage generator 202. More particularly, FIG. 5 depicts a conceptual example of a single line CDS system 200 utilizing two proton accelerators 205a and 205b (a "two head" system) adapted for inspecting a plurality of target objects, for example, four cargo containers. As shown in the FIG. 5, each of four containers 222a, . . . , 222d may be simultaneously inspected. At each container being inspected, a variety of detector arrays are shown including: a NFD (nuclear resonance fluorescence detector) array(s) 225 shown on the inner side of containers 222a and 222b before the high energy proton beam split (i.e., incoming beam side) so as to avoid picking up absorption or gamma rays going in, but what is fluorescing coming out (all directions); a ND (Neutron detector) array(s) 226 shown on the outside of the containers, and are actually gamma insensitive neutron detectors to detect neutrons emitted in the photofission; a NRD (non-resonant detector) array(s) 227 comprising, for example, BGO, sodium iodide, etc.; and, a RD (resonant detector) array(s) 228 that includes a sample of the element that is being detected (e.g., will fluroresce when element detected). The configuration depicted in FIG. 5 is a basic configuration comprising the following elements: a single high voltage power supply or generator 202, two proton beam accelerators 205a and 205b (however, it is understood that only one accelerator may be implemented), one or multiple targets 222a, . . . , 222d, and, the combinations of the NFD, ND, NRD and RD detectors in arrays.

A portal array for passive detectors can be easily integrated within the CDS system(s) depicted in FIGS. 2 and 5. In such CDS system(s), additional active means of detection including X-ray/CT-X-ray, Dual energy X-ray, Multiple energy/multiple beam CT-X-ray and/or X-ray Diffraction are incorporated for enhanced imaging and measure of Z and density. Nuclear Quadrapole Resonance (NQR) detection may additionally be incorporated into the overall system to provide specific molecular detection. Nuclear Magnetic Resonance (NMR) detection combined with Electron Spin Resonance (ESR) (overhauser effect) such as described in U.S. Pat. No. 4,719,425, the whole contents and disclosure of which is incorporated by reference herein, may also be incorporated for additional molecular identification. Multi-resonant broadband spectroscopy and imaging may also be incorporated into the system. The incorporation of Terahertz interrogation or Terahertz Camera may also be included. Additional passive detectors may also be incorporated for sensing by vapor detection, and additional nuclear detection may be incorporated with passive sensitive neutron and gamma detectors both imaging and non-imaging.

Figure 6:
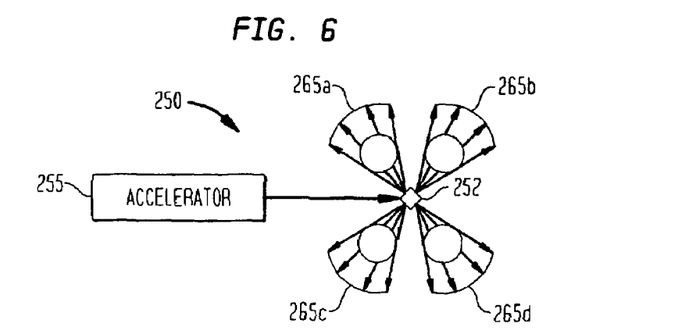
FIG. 6 depicts a single system including a proton beam accelerator and proton beam target for producing gamma beams that simultaneously feed four (4) inspection stations.

FIG. 6 depicts a single CDS system 250 including a proton beam accelerator 255 and proton beam target 252 for gamma beam production that feeds simultaneously four (4) inspection nodes or stations. In this single system embodiment, the gamma beams 265a, . . . ,265d emanate in a circle (e.g., in a cone) from the target 252, and may be used to inspect four (4) target objects (e.g., LD3 containers) simultaneously. It is understood that additional objects may be detected in this configuration.

Figure 7:
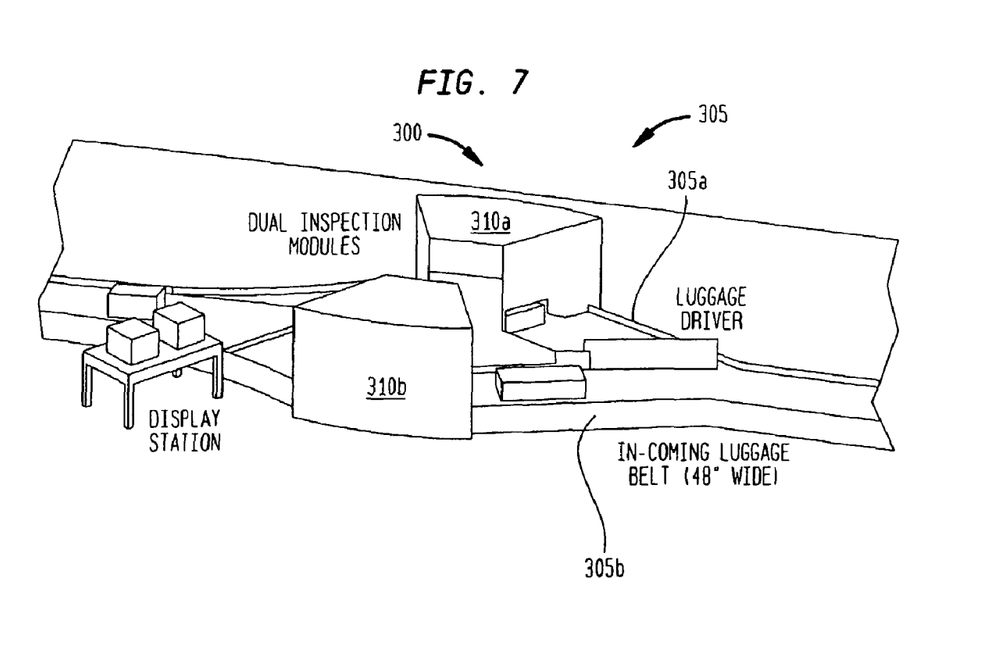
FIG. 7 depicts a single system including a single source supporting two conveyors for detecting contraband in small parcels or baggage.

FIG. 7 depicts a single CDS system 300 including a single source supporting two conveyors 305a, b for detecting contraband in small parcels or baggage that have been conveyed and/or diverted into each of two detection stations. For example, an accelerator (not shown) is located under the floor below a baggage conveyor system 305, and the target (not shown) may be in a central location. It is understood that multiple (e.g., four) objects on conveyors may be simultaneously inspected (as in FIG. 6), although only two conveyors are shown at either side of the target for checking checked-in or carry-on baggage. It is understood that while the gamma beams may be sourced from underneath the floor, the accelerator may be remote from the scanning stations. For example, in one embodiment, the proton beam may be bent up onto a $^{13}C$ proton beam target, causing gammas to emanate in a horizontal plane. In the system 300 shown in FIG. 10, the gamma beam is collimated into two ~20° sections 310a, 310b, which scan bags on the respective conveyors 305a, 305b. Such a system, using a 10 mA accelerator, may inspect up to 1600 bags/hour for nitrogen-bearing explosives. In another embodiment, the accelerator again may be located below the baggage-handling level, but its beam would be horizontal and the gamma fan nearly vertical. Detectors mounted above the conveyors could scan in a vertical section through the bags. These configurations would depend on the available space and layout of the facility. In either of them, the scan time for a luggage-size parcel is less than 6 sec.

Figure 8:
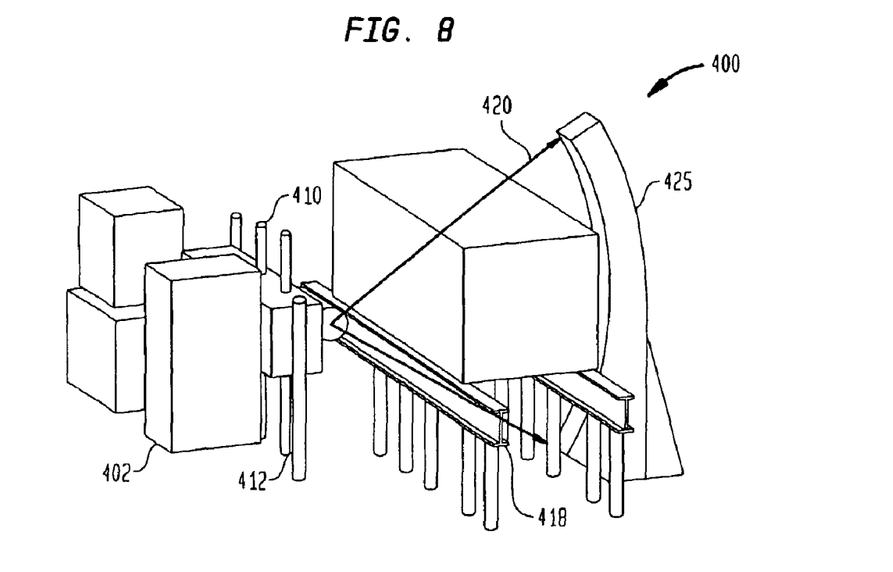
FIG. 8 depicts a single system including a large detector array for inspecting large containers.

FIG. 8 depicts a single system 400 including a large detector array 425 for inspecting large containers. The system 400 of FIG. 8 is an RF accelerator based system including an RF power source 402, an RF proton beam accelerator 410 and a gamma production target 412 such as described herein. A container handler 418, e.g., conveyor, is provided that is subject to a produced resonant gamma ray fan 420. An array of resonant type detectors 425 such as described herein are provided that detect nuclear resonance-type phenomena.

Figure 9:
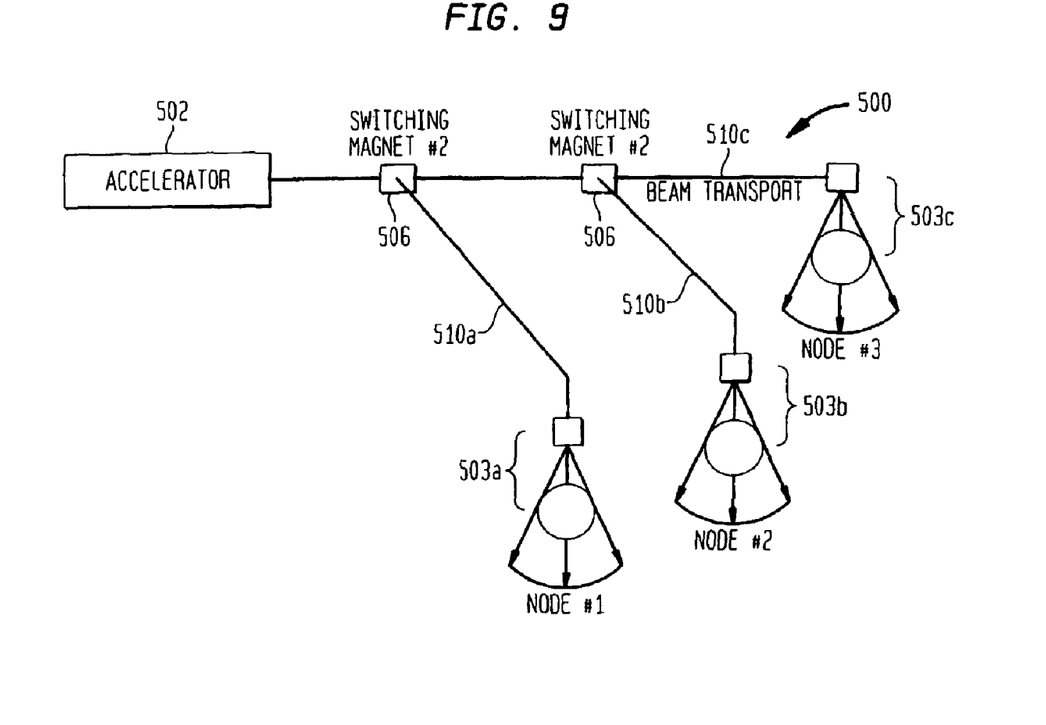
FIG. 9 depicts a single proton beam accelerator feeding multiple inspection nodes with each node capable of inspecting four inspection stations in accordance with the embodiment depicted in Figure as in FIG. 6.

FIG. 9 depicts a single CDS system 500 utilizing a single proton beam accelerator 502 feeding multiple inspection nodes with each node capable of inspecting four inspection stations in accordance with the embodiment as depicted in FIG. 6. In the system 500 depicted in FIG. 9, the accelerator is remotely located (e.g., outside an airport terminal or on the roof of a building), and the proton beam lines 510a-510c (similar to waveguides) are run to different locations in the building which hit a target for raster scanning multiple nodes 503a-503c off the accelerator. Although at each node only a single arc (gamma beams) is depicted, each node may handle two or four conveyors (objects). Thus, FIG. 9 depicts a beam-splitting or time sharing configuration utilizing beam switching mechanisms 506.

Figure 10:
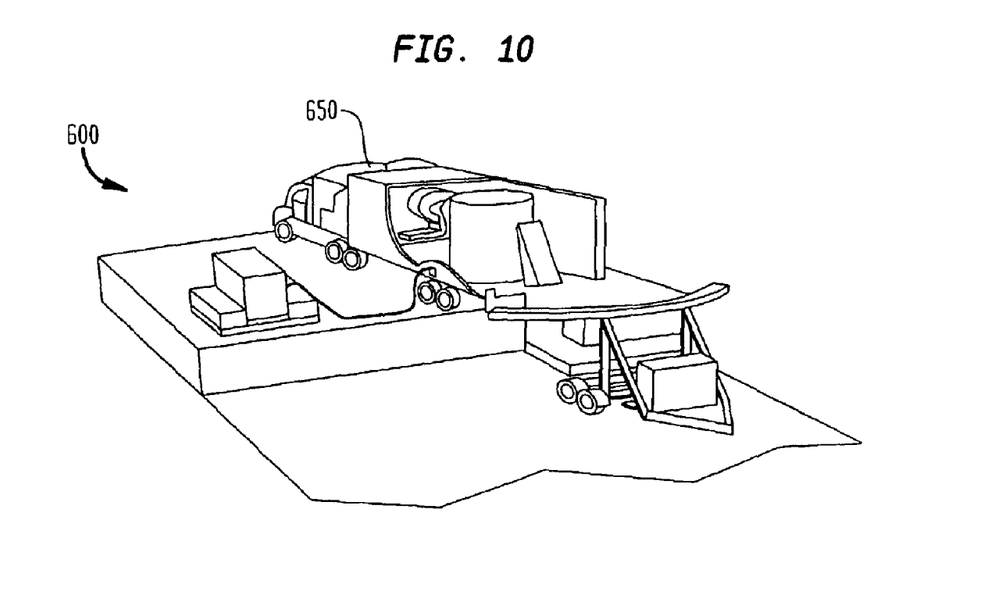
FIG. 10 depicts a transportable CDS system, e.g., a single system, wholly contained in a vehicle, such as a truck, for instance, and shown inspecting a target container such as an LD3 container.

FIG. 10 depicts a transportable CDS system 600, e.g., a single system, wholly contained in a vehicle 650, such as a truck, for instance, and shown inspecting a target container such as an LD3 container.

Figure 11:
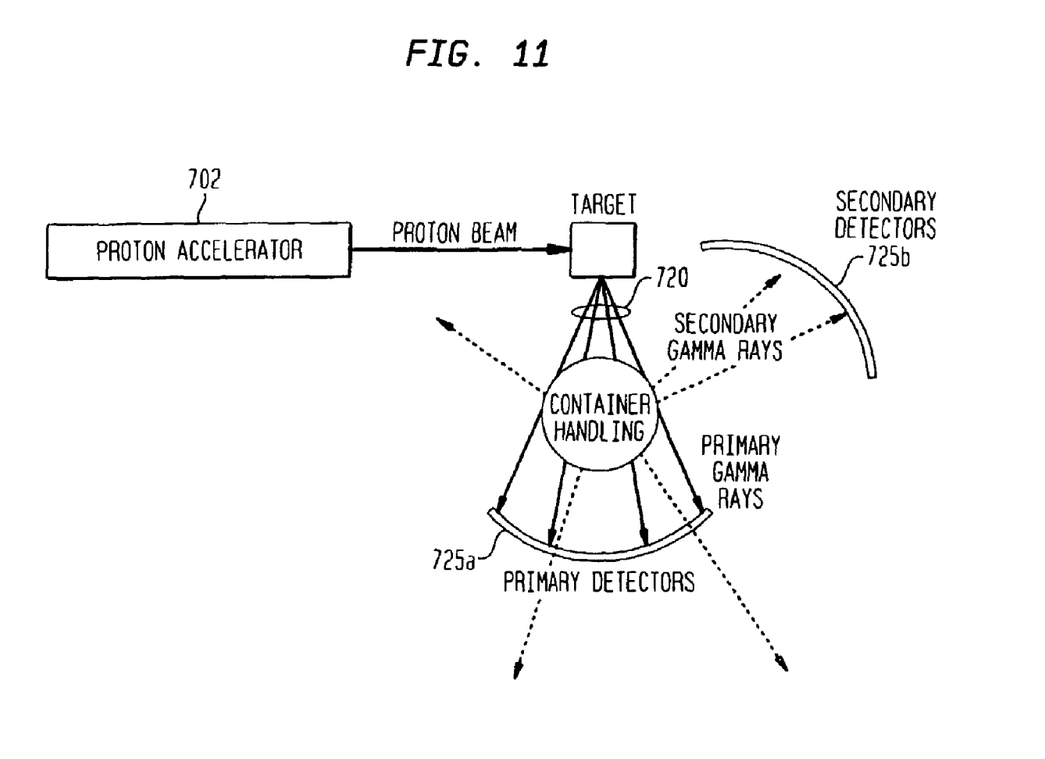
FIG. 11 depicts a CDS system including detectors for measuring Gamma Resonance Absorption combined with detectors for measuring Gamma Resonance Fluorescence; and, FIG. 12 depicts an example of standoff CDS system including a vehicle mounted unit provided for inspecting another vehicle from a distance.

FIG. 11 depicts a basic Gamma Resonance Absorption system 700 combined with a Gamma Resonance Fluorescence mode. In this embodiment, there is a proton beam accelerator 702 producing a proton beam that hits a target that gives off gamma rays that pass through the target object (e.g., a container) with an array of primary detectors 725a provided for measuring gamma resonance absorption, and an array of secondary detectors 725b provided for measuring gamma ray fluorescing. It is understood that the location of the secondary detectors 725b may be placed anywhere, and, skilled artisans will note that based on fluorescence properties of particular contraband elements, objects may be located at specific angles with respect to the incoming gamma beam 720.

Figure 12:
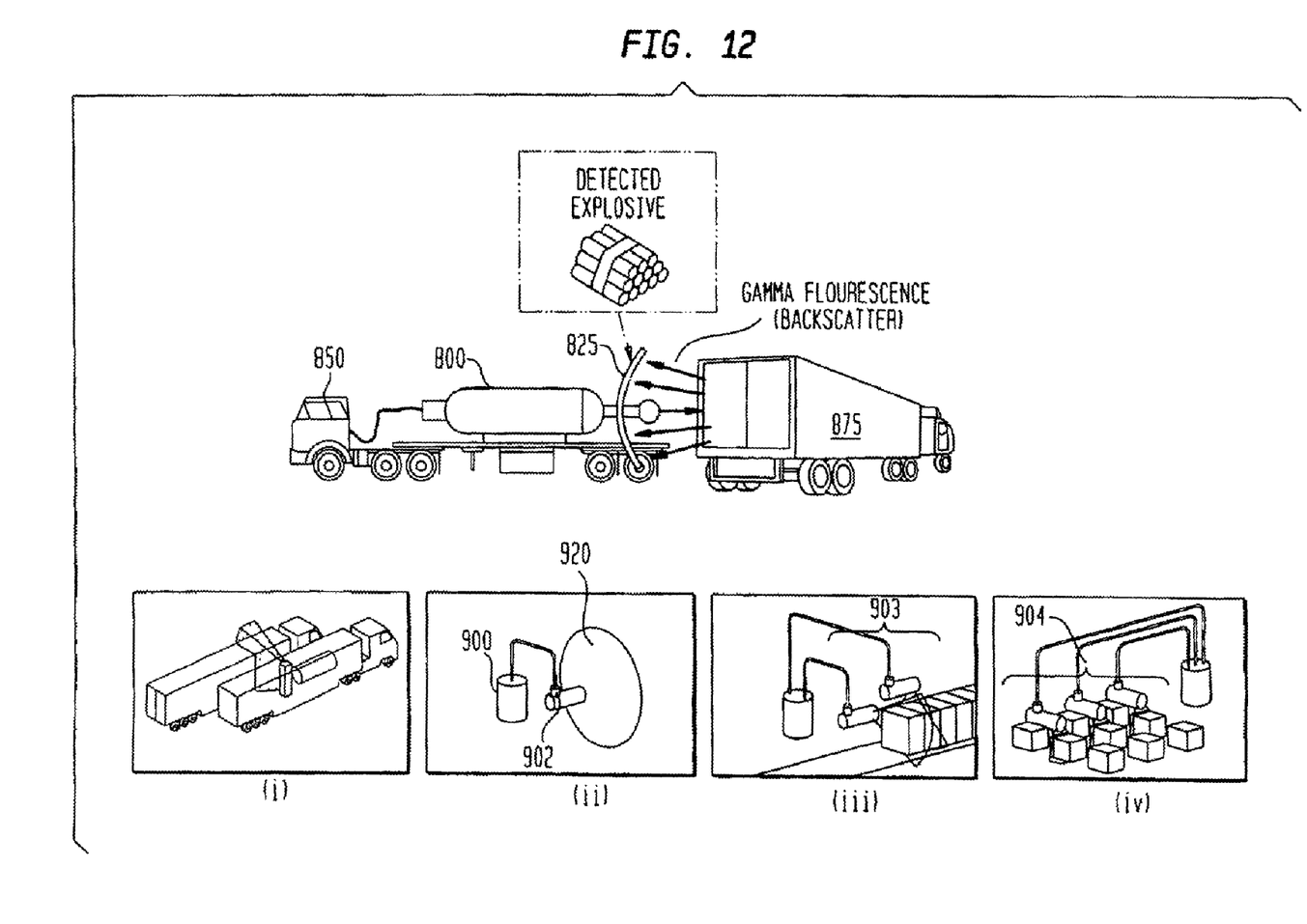

FIG. 12 depicts an example of standoff CDS system 800 including a vehicle 850 (e.g., truck) mounted unit provided for inspecting another vehicle 875 (e.g., truck) from a distance (i.e., the whole system and operator are away from the scanned object). In this example, the truck includes an arc of detectors 825 to provide backscatter or fluorescence detection (e.g., nitrogen), and thus can perform a single-sided scan. It is contemplated that the distance between the mobile single system unit and the inspected object (e.g., a truck) may be 100 yards, but depends upon the ability to separate out gammas coming back (e.g., backscatter) from gamma rays in the air. In this embodiment, the beam is located a distance away, e.g., from a checkpoint, and is directed at the truck to look for the contraband item (e.g., nitrogen) which fluorescence or backscatter may be detected. If contraband is detected, the truck may be further directed to a portal for further imaging etc. Additionally shown are transportable and multiple accelerator configurations including: a single power supply 900 and single accelerator 902 producing a single fan beam 920 (see FIGS. 12(*i*) and 12(*ii*)); a single power supply and two accelerators 903 shown in a configuration with an accelerator on the side and on top of the object for two simultaneous projections (see FIG. 12(*iii*)); and, a single power supply and three accelerators 904 shown in a planar configuration (see FIG. 12(*iv*). It is understood that each accelerator may have multiple-layered targets, segmented targets or single targets for multi-mode detection, as described herein.

The CDS systems according to this aspect of the present invention are unique due to the following factors: 1) they provide for the simultaneous detection of a variety of materials such as SNM, IND, explosives, and is expandable to detect additional threat materials; 2) shielding in one modality is compensated by its ineffectiveness in the other, e.g., water will shield neutron emissions induced by photofission, but it can easily be counterbalanced by concurrent high Z detection; 3) they are adapted for generating either planar, 2D, or CT, 3D images that depend only on the system architectures; 4) the systems may be automated using threat algorithms due to the systems' high specificity; 5) they achieve increased throughput due to multimodality in a single scan; 6) they may implement use of a single power supply that feed several acceleration heads allowing for a distributed system at considerably reduced cost; 7) the generate a gamma ray fan beam, with each head feeding into several inspection stations; 8) the systems' open architecture permits the same system to be used for inspecting a variety of target objects including, but not limited to: parcels, large cargo, cars, and boats; 9) the same systems have secondary uses for unrelated military and medical applications.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

The invention claimed is:

1. A multi-modal contraband detection system for detecting contraband materials in one or more target objects, said system comprising:
   a proton beam accelerator device for producing a high energy beam of protons at a specific energy;
   a single proton beam target for generating one or more gamma ray beams in response to impinging high energy beam of protons, said generated one or more gamma ray beams being simultaneously directed to a target object; and,
   a plurality of detector means associated with the target object, said plurality of detector means being utilized simultaneously to provide multiple modes of detecting presence of contraband materials in each said target object by utilizing a same proton beam, said multiple modes of detection comprising:
      nuclear resonance fluorescence as detected by a nuclear resonance fluorescence detector array to detect fluorescing reaction with said target object on an incoming proton beam side of said target object;
      nuclear resonance absorption and/or non-resonant absorption as detected by respective resonant and non-resonant gamma ray detectors; and,
      photo-fission phenomena as detected by a gamma-insensitive neutron detector array to detect neutrons emitted in a photo-fission reaction with material included in said target object,
      wherein said system enables detection of contraband materials by detecting both nuclear resonance fluorescence and/or nuclear resonance absorption and photo-fission reaction in a single scan.

2. The multi-modal contraband detection system of claim 1, wherein said plurality of detector means further includes one or more selected from the group comprising:
   a means for detecting neutrons; a high-Z sandwich detector; a non-resonant detector array; a resonant detector array enriched with a sample of an element that is being detected; means selected from the group comprising: X-ray/CT-X-ray detection, Dual energy X-ray detection, multiple energy/multiple beam CT-X-ray and X-ray Diffraction; a Terahertz interrogation device for detection; a Nuclear Quadrapole Resonance detector adapted to provide detection of specific molecules; an NMR/ESR device adapted to provide detection of specific free radicals; and a passive detector means, or combinations thereof.

3. The multi-modal contraband detection system of claim 2, wherein a non-resonant detector array includes a detector selected from: BGO, sodium iodide detector, or other gamma detectors or neutron detectors.

4. The multi-modal contraband detection system of claim 2, wherein one of said plurality of detector means is adapted to measure density of a contraband material contained in said target objects.

5. The multi-modal contraband detection system of claim 2, wherein one of said plurality of detector means includes means adapted to generate one or more images selected from the group comprising: planar, 2D, or CT, and 3D images.

6. The multi-modal contraband detection system of claim 1, further comprising means for rotating a proton beam target to generate multiple gamma ray beams in response to impinging proton beams.

7. The multi-modal contraband detection system of claim 6, wherein directivity of said gamma ray beams is controlled to become parallel with a direction of said impinging target proton beam.

8. The multi-modal contraband detection system of claim 1, wherein said proton beam target generates one or more gamma ray beams at one or more angles, said system further comprising means for orienting an angle of said proton beam target relative to a direction of said impinging proton beam to control directivity of said gamma ray beams.

9. The multi-modal contraband detection system of claim 1, wherein said proton beam target generates one or more gamma ray beams at one or more angles, one or more of said plurality of detector means being oriented at an angle relative to said proton beam target for receiving said gamma ray beams.

10. The multi-modal contraband detection system of claim 9, wherein said means for producing a gamma ray beam pulse includes a shutter device timed to interrupt a generated gamma ray beam to provide said gamma ray beam pulse.

11. The multi-modal contraband detection system of claim 1, further comprising a means for producing a gamma ray beam pulse for enabling detection of delayed neutrons emitted in a photofission reaction with material included in a target object.

12. The multi-modal contraband detection system of claim 1, wherein one of said plurality of detector means includes an energy discriminating detector and/or a position sensitive detector.

13. The multi-modal contraband detection system of claim 1, wherein one said proton beam target is of a composite configuration comprising two or more different materials for generating multiple gamma ray beams each associated with a reaction of protons with a respective material.

14. The multi-modal contraband detection system of claim 1, wherein one said proton beam target is of a layered configuration comprising two or more different materials for generating multiple gamma ray beams each associated with a reaction of protons with a respective material.

15. The multi-modal contraband detection system of claim 1, wherein one said proton beam target is of a segmented configuration comprising at least two different materials for generating multiple gamma ray beams each associated with a reaction of protons with a respective material.

16. The multi-modal contraband detection system of claim 1, further comprising:
   a plurality of proton beam targets, each adapted for generating one or more gamma ray beams in response to impinging high energy beam of protons; and,
   one or more switching means for directing said high energy beam of protons to each of plurality of said proton beam targets along different paths, wherein each said plurality of proton beam targets generates one or more gamma rays in response to impinging beam of protons, and each of said generated one or more gamma ray beams being directed to multiple target objects to enable detection of contraband material in multiple target objects.

17. The multi-modal contraband detection system of claim 16, further including means for timing switching of said switching means to enable raster scan of each of said generated one or more gamma ray beams for detecting contraband in multiple target objects.

18. The multi-modal contraband detection system of claim 16, wherein said switching means is timed to enable simultaneous detection of contraband in multiple target objects.

19. The multi-modal contraband detection system of claim 1, further comprising:
   a plurality of proton beam targets, each adapted for generating one or more gamma ray beams in response to impinging high energy beam of protons; and, a proton beam splitter device associated with said accelerator device for producing a plurality of high energy proton beams for impingement upon a respective one of said plurality of proton beam targets, wherein each of said plurality of proton beam targets generates one or more gamma rays in response to impinging beam of protons, and each of said generated one or more gamma ray beams being directed to multiple target objects to enable simultaneous detection of contraband material in multiple target objects.

20. The multi-modal contraband detection system of claim 1, further comprising:
an additional proton beam accelerator device for producing a second high energy beam of protons at a specific energy; and,
an additional proton beam target for generating one or more gamma ray beams in response to said second impinging high energy beam of protons, said generated one or more gamma ray beams being simultaneously directed to a further target object, whereby simultaneous detection of contraband in at least two target objects is enabled.

21. The multi-modal contraband detection system of claim 1, wherein one of said plurality of detector means is adapted to measure Z of a contraband material contained in said target objects.

22. The multi-modal contraband detection system of claim 1, adapted to perform stand-off detection.

23. The multi-modal contraband detection system of claim 1, adapted to be mounted on vehicle for providing a single-sided scan.

24. A vehicle comprising a contraband detection system for providing stand-off detection of contraband materials in a target object, said contraband detection system comprising:
a proton beam accelerator device for producing a high energy beam of protons at a specific energy;
a single proton beam target for generating one or more gamma ray beams in response to impinging high energy beam of protons, said generated one or more gamma ray beams being simultaneously directed to a target object; and,
a plurality of detector means associated with the target object, wherein said plurality of detector means provide multiple modes of detecting presence of contraband materials in each said target object, at least one mode comprising:
nuclear resonance fluorescence as detected by a nuclear resonance fluorescence detector array to detect fluorescing reaction with said target object on an incoming proton beam side of said target object.

25. A multi-modal contraband detection system adapted to detect contraband material in containers traveling on a conveyor, said multi-modal contraband detection system comprising:
a proton beam accelerator device for producing a high energy beam of protons at a specific energy;
a single proton beam target for generating one or more gamma ray beams in response to impinging high energy beam of protons, said generated one or more gamma ray beams being simultaneously directed to a container; and,
a plurality of detector means providing multiple modes of detecting presence of contraband materials in said container; said plurality of detector means being utilized simultaneously to provide multiple modes of detecting presence of contraband materials in each said target object by utilizing a same proton beam, said multiple modes of detection comprising:
nuclear resonance fluorescence as detected by a nuclear resonance fluorescence detector array to detect fluorescing reaction with said target object on an incoming proton beam side of said target object;
nuclear resonance absorption anchor non-resonant absorption as detected by respective resonant and non-resonant gamma ray detectors; and,
photo-fission phenomena as detected by a gamma-insensitive neutron detector array to detect neutrons emitted in a photo-fission reaction with material included in said target object,
wherein said system enables detection of contraband materials by detecting both nuclear resonance fluorescence and/or nuclear resonance absorption and photo-fission reaction in a single scan.

26. A multi-modal contraband detection system for detecting contraband materials in one or more target objects, said system comprising:
a plurality of proton beam accelerator devices each for producing a high energy beam of protons at specific energies;
a plurality of proton beam targets each for generating one or more gamma ray beams in response to an impinging high energy beam of protons from a respective accelerator, said generated one or more gamma ray beams being simultaneously directed to one or more target objects; and,
a plurality of detector means associated with the one or more target objects, wherein said plurality of detector means being utilized simultaneously to provide multiple modes of detecting presence of contraband materials in each said one or more target object, said multiple modes of detection comprising:
nuclear resonance fluorescence as detected by a nuclear resonance fluorescence detector array to detect fluorescing reaction with said target object on an incoming proton beam side of each said one or more target objects;
nuclear resonance absorption and/or non-resonant absorption as detected by respective resonant and non-resonant gamma ray detectors; and,
photo-fission phenomena as detected by a gamma-insensitive neutron detector array to detect neutrons emitted in a photo-fission reaction with material included in said one or more target objects,
wherein said system enables detection of contraband materials by detecting both nuclear resonance fluorescence and/or nuclear resonance absorption and photo-fission reaction in a single scan.

27. A method of detecting contraband materials in one or more target objects, said method comprising:
a) providing a proton beam accelerator device for producing a high energy beam of protons at a specific energy;
b) providing a single proton beam target for generating one or more gamma ray beams in response to impinging high energy beam of protons, said generated one or more gamma ray beams being simultaneously directed to a target object; and,
c) providing multiple modes of detecting presence of contraband materials in each said target object by implementing a plurality of detector means; said plurality of detector means being utilized simultaneously to provide multiple modes of detecting presence of contraband materials in each said one or more target objects by utilizing a same proton beam, said multiple modes of detection comprising:

nuclear resonance fluorescence as detected by a nuclear resonance fluorescence detector array to detect fluorescing reaction wit said target object on an incoming proton beam side of said one or more target objects;

nuclear resonance absorption and/or non-resonant absorption as detected by respective resonant and non-resonant gamma ray detectors; and, photo-fission phenomena as detected by a gamma-insensitive neutron detector array to detect neutrons emitted in a photo-fission reaction wit material included in said one or more target objects, wherein said method detects contraband materials by detecting both nuclear resonance fluorescence and/or nuclear resonance absorption and photo-fission reaction in a single scan.

* * * * *